Figure 4:
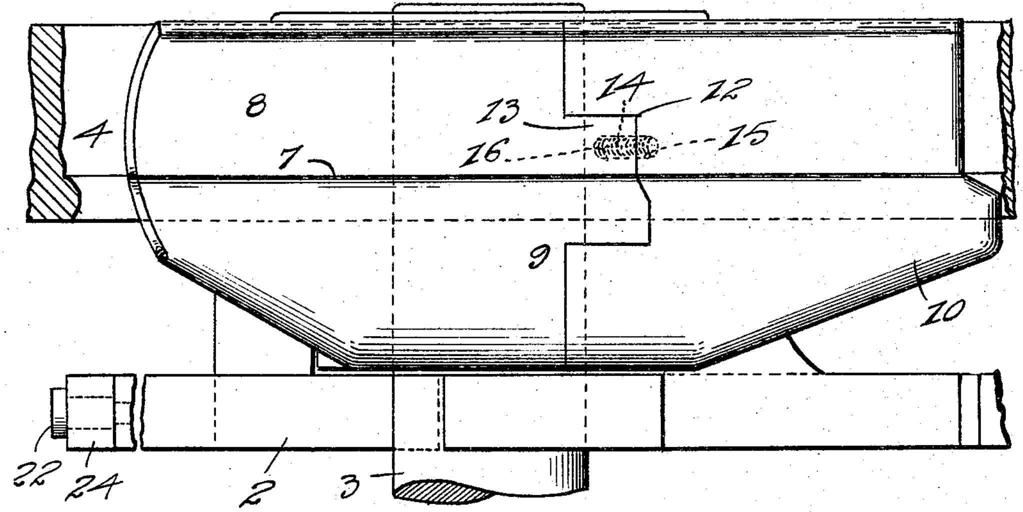

G. W. MEGNIN.
CAR BRAKE.
APPLICATION FILED SEPT. 18, 1915.
1,188,296.
Patented June 20, 1916.
4 SHEETS—SHEET 1.
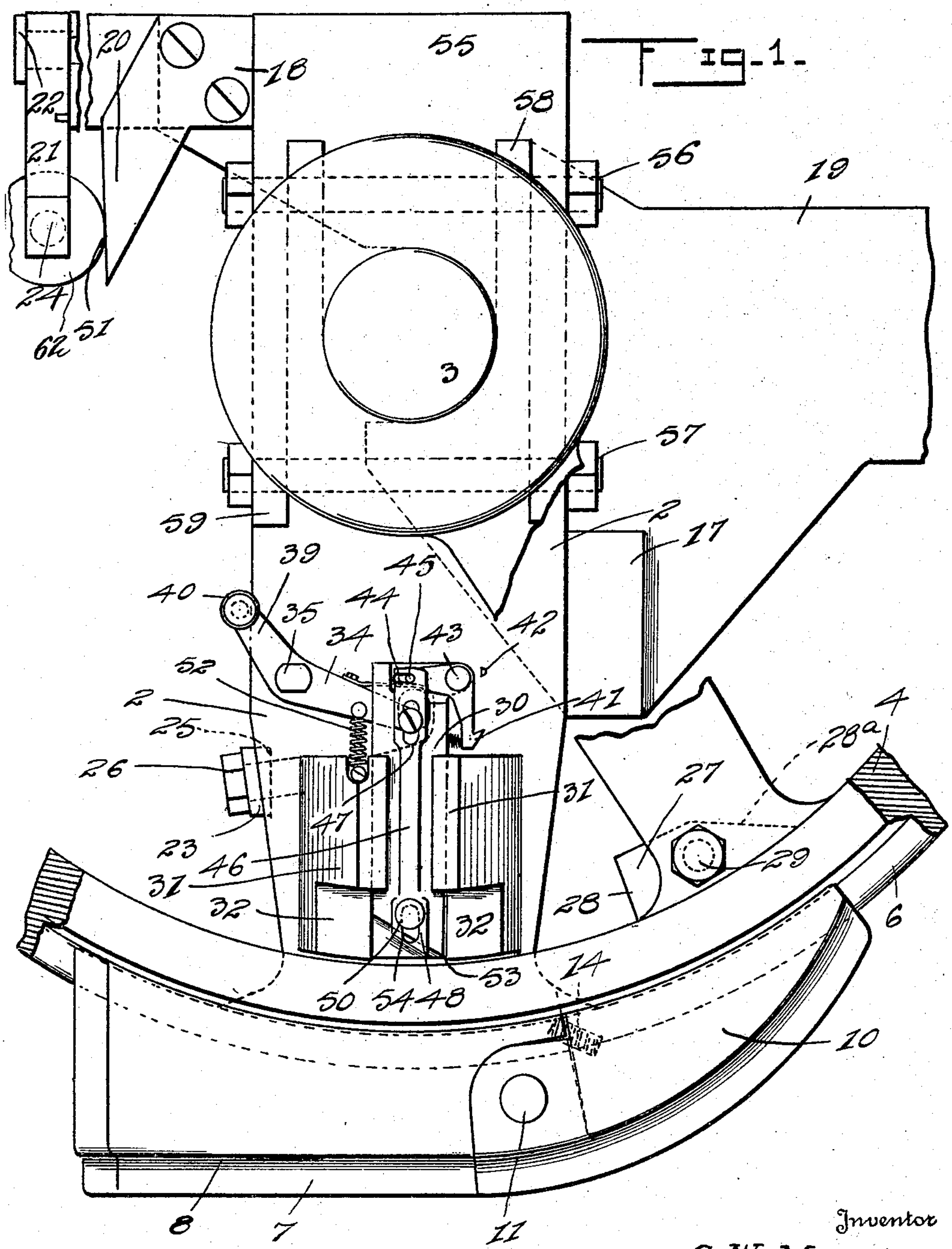
Inventor
G. W. Megnin.
Witnesses
C. R. Beall.
H. J. Riley
By [signature] Attorney G. W. MEGNIN.
CAR BRAKE.
APPLICATION FILED SEPT. 18, 1915.
1,188,296.
Patented June 20, 1916.
4 SHEETS—SHEET 2.
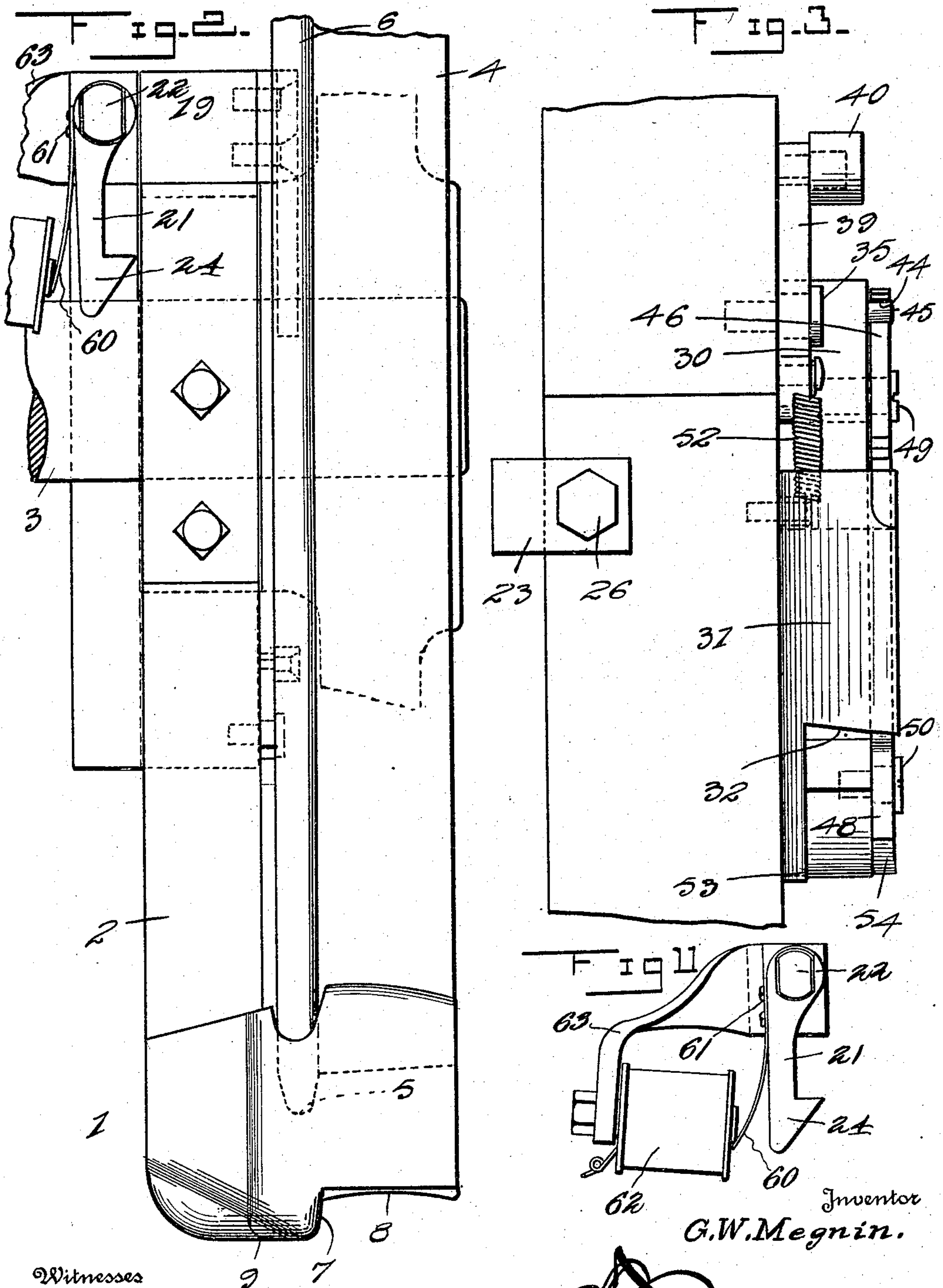
Witnesses
C. R. Beall
H. J. Riley
Inventor
G. W. Megnin.
By [signature] Attorney
THE COLUMBIA PLANOGRAPH CO., WASHINGTON, D. C.

G. W. MEGNIN.

CAR BRAKE.

APPLICATION FILED SEPT. 18, 1915.

1,188,296.

Patented June 20, 1916.

4 SHEETS—SHEET 3.

Inventor

G. W. Megnin

Witnesses

C. R. Beall

H. T. Riley

By

Attorney

THE COLUMBIA PLANOGRAPH CO., WASHINGTON, D. C.

G. W. MEGNIN.
CAR BRAKE.
APPLICATION FILED SEPT. 18, 1915.
1,188,296.
Patented June 20, 1916.
4 SHEETS—SHEET 4.
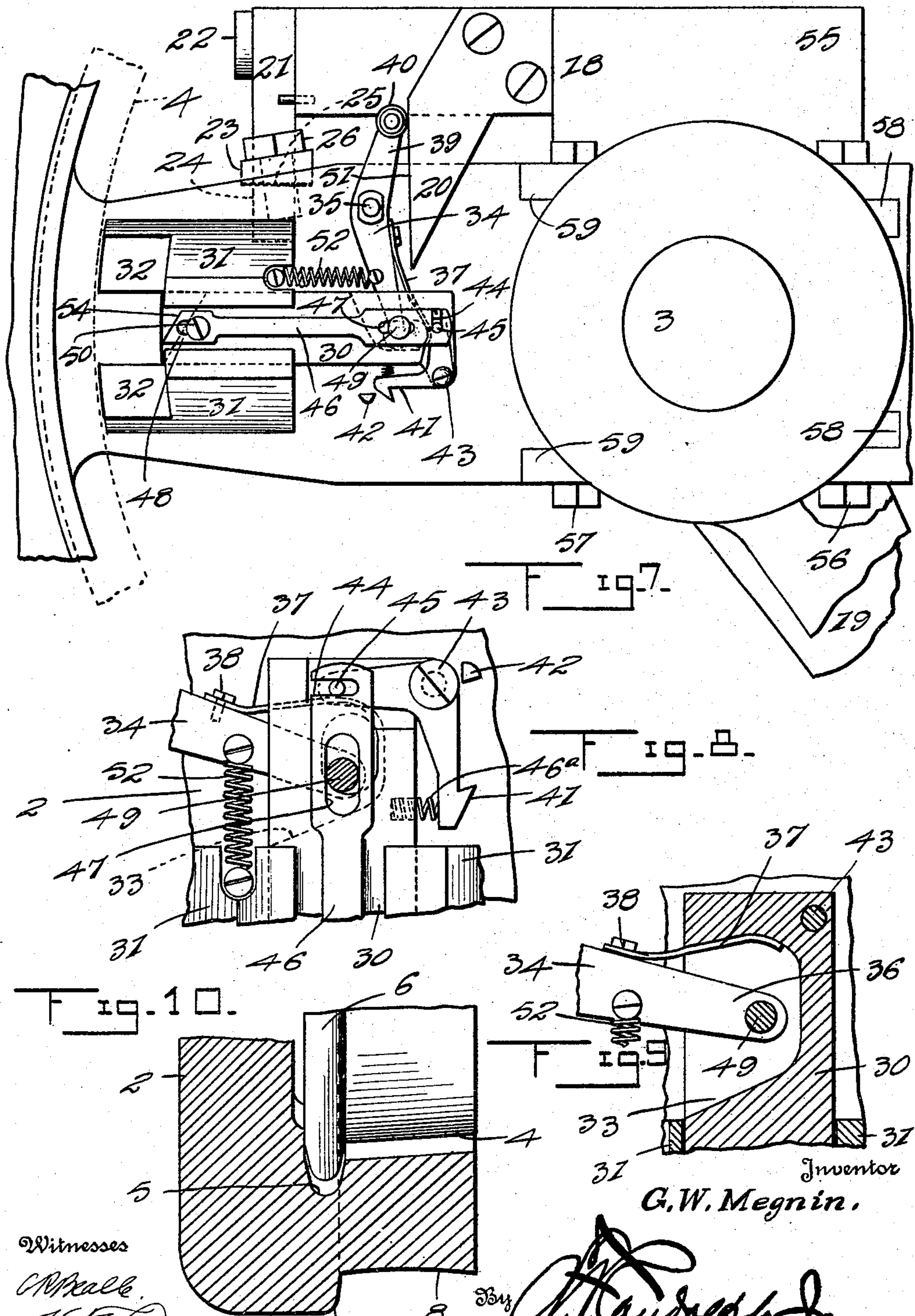

UNITED STATES PATENT OFFICE.

GEORGE W. MEGNIN, OF ALLENDALE, NEW JERSEY.

CAR-BRAKE.

1,188,296. Specification of Letters Patent. Patented June 20, 1916.

Application filed September 18, 1915. Serial No. 51,367.

*To all whom it may concern:*

Be it known that I, George W. Megnin, a citizen of the United States, residing at Allendale, in the county of Bergen and State of New Jersey, have invented certain new and useful Improvements in Car-Brakes; and I do hereby declare the following to be a full, clear, and exact description of the invention, such as will enable others skilled in the art to which it appertains to make and use the same.

The invention relates to improvements in car brakes.

The object of the present invention is to improve the construction of car brakes and to provide a simple, practical and comparatively inexpensive brake structure designed for use on cars and various other conveyances and capable of stopping a train or a vehicle in a much shorter time and less distance than is possible with brakes of the ordinary construction.

A further object of the invention is to provide a track brake adapted to present a relatively large amount of brake surface to the rails or a roadway and capable of operating as a fender to prevent a person or other object from being run over by the wheels of a train.

It is also the object of the invention to provide a brake of this character adapted to reduce the cost of maintenance to a minimum and capable of permitting the wheels of a train or vehicle to turn freely regardless of whether the brake is in action or not, thereby eliminating all strain on the motor or engine when the brakes are applied.

A further object of the invention is to provide a brake adapted to be maintained normally in an elevated inoperative position and capable when released of swinging downwardly in advance of the wheels and of utilizing the momentum of a train or vehicle for carrying it into its engaging position and capable also of being automatically reset through the rotary movement of the wheels.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 5:
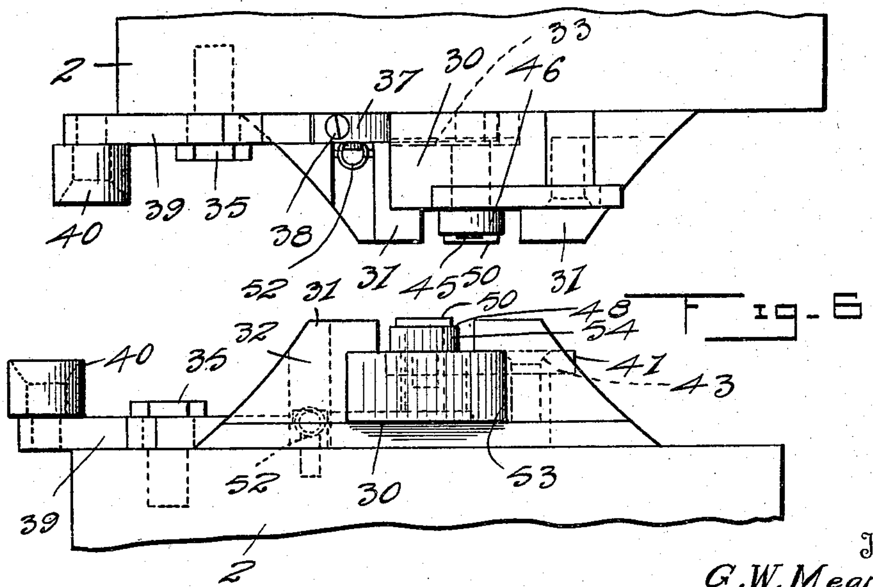

In the drawings Figure 1 is a side elevation of a car brake constructed in accordance with this invention, and shown arranged in its engaging position, Fig. 2 is an edge view of the car brake, Fig. 3 is an enlarged edge view of the lower portion of the brake taken from the same side of the device as Fig. 2, Fig. 4 is a reverse plan view of the brake shoe, Fig. 5 is a plan view of the resetting mechanism of the brake, Fig. 6 is a reverse plan view of the same, Fig. 7 is a side elevation illustrating the arrangement of the parts when the brake is in its elevated inoperative position, Fig. 8 is an enlarged detail view of a portion of the resetting mechanism, Fig. 9 is an enlarged detail sectional view of the inner or upper end of the lifting bar and the adjacent end of the cam actuated lever, Fig. 10 is a detail sectional view taken transversely of the track shoe, Fig. 11 is a detail view of the latch and electromagnet for operating the same to release the emergency brake.

Like numerals of reference designate corresponding parts in all the figures of the drawings.

In the accompanying drawings in which is illustrated the preferred embodiment of the invention, the car brake comprises in its construction a track shoe showing an arm 2 which is hung at its inner or upper end from the axle 3 of a car wheel 4. The brake is designed for use on various kinds of cars and other conveyances such as automobiles but when the brake shoe is employed on a railroad train it is provided in its upper face with a central longitudinal groove 5 for the reception of the flange 6 of the car wheel and it is also provided at its lower face with a shoulder 7 located at the inner side of the braking face 8 and consisting of a flange or enlargement which will be of a width to fit in the groove of a rail when the shoe is employed on electric cars running on grooved rails.

The brake shoe which is designed to swing downwardly in advance of the wheel 4 is provided with a tapered or wedge shaped nose or front portion 10 preferably pivoted to the body portion of the brake shoe by a transverse pin 11 which passes through alined openings of the adjacent portions of the nose and the body of the shoe. The nose is preferably provided at its jointed end with a central recess 12 and the body portion of the shoe is provided with a projecting lug 13 which fits in the recess 12. The adjacent shoulders or edges at the jointed ends of the body portion of the shoe and the nose thereof are preferably arranged to provide a slight pivotal movement of the nose 10 which is maintained at the downward or outward limit of its movement by a coiled spring 14 interposed between the sections or portions of the shoe and preferably arranged in opposite sockets 15 and 16 thereof. The front tapered portion of the nose of the shoe extends rearwardly with respect to the wheel when the shoe is swung downwardly and caused to pass beneath the wheel through the momentum of the car or train. When the shoe is in this position as illustrated in Fig. 1 of the drawings, the car wheel 4 is free to turn and the engine or motor of the car or train is relieved of strain in the application of the brakes.

The arm of the brake shoe may be mounted on the axle in any desired manner and its downward and rearward swing is limited by lugs 17 and 18 respectively of a bar or member 19 preferably mounted on the axle 3 and adapted to support a cam plate 20 and a latch 21 for holding the brake shoe in an elevated position out of engagement with the track. The arm 2 extends above and below the axle when in a vertical position as illustrated in Fig. 1 of the drawings and the lugs 17 and 18 which are located below and above the horizontal plane of the axle are engaged by the front and rear edges of the arm and they limit the downward and rearward swing of the brake shoe. The latch 21 is pivoted to the supporting member 19 by a pin or screw 22, and the latch which may operate by gravity to engage a projecting portion or piece 23 of the arm 2 has a beveled head 24 at its lower end. The beveled head forms a shoulder for engaging the piece 23 which is secured in a recess 25 of the arm 2 by a screw 26 or other suitable fastening device, but an integral lug or projection may of course be employed for this purpose. Any suitable means may of course be employed for withdrawing the latch or catch from beneath the projecting coacting portion of the arm 2 to cause the brake shoe to swing downwardly beneath the wheel 4. The brake shoe when in the position illustrated in Fig. 1 of the drawings presents a relatively large braking surface or face to the track and enables the device to operate as an emergency brake and to stop a train in a comparatively short time and before the train has moved any considerable distance. In practice, a car will be equipped with eight of the brake shoes, four being arranged for operation when the car is running in one direction and the other four when the car is traveling in the opposite direction.

After an application of the brake, the brake shoes are lifted by reversing the wheels of the train. The wheel 4 is provided with a lifting block 27 provided at one end with a flat face 28 and having its other end 28ª beveled. The lifting block 27 is preferably secured to one of the spokes of the wheel 4 by a bolt or screw 29 and the beveled end of the block is arranged at the front and is presented to the mechanism, about to be described, when the wheel is rotated in a forward direction, and when the wheel is reversed the squared or flat end 28 is presented to such mechanism to enable the wheel to lift the brake shoe and return it to its elevated position at the latch 24. When the wheel rotates rearwardly the lifting block engages the side edge of a slidably mounted lifting bar or member 30 mounted in guides 31 which extend longitudinally of the arm 2. The guides 31 are preferably formed integral with the arm 2 of the brake shoe and they have recessed or cut away outer portions 32 to provide a passage for the lifting block 27 and to expose the side edge of the slidable bar or member 30 to enable the same to be engaged by the said lifting block. The slidable bar or member which extends inwardly or upwardly beyond the guides 31 is provided in its inner or upper portion with a recess 33 receiving one end of an angle lever 34 fulcrumed intermediate of its ends at 35 on the arm 2 of the brake shoe and composed of two angularly related arms located at an obtuse angle to each other as clearly illustrated in Figs. 1 and 7 of the drawings. The arm 36 of the lever 34 carries a spring 37 consisting of a relatively stiff piece of resilient material secured at its inner end 38 to the upper edge of the arm 36 and having its free end engaging the upper wall or shoulder of the recess 33.

The spring 37 by engaging the upper wall or shoulder of the recess 33 maintains the adjacent end of the lever in spaced relation with the said upper wall or shoulder and when the other arm 39 of the lever 34 which is provided with a roller 40 comes in contact with the cam plate 20 the lever 34 is oscillated and the slidable bar or member 30 is moved upwardly or inwardly until a catch 41 carried by the said bar or member 30 engages a stop pin 42 of the arm 2. This inward movement of the bar or member 30 partially withdraws the lower or outer end of the same from the end 28 of the lifting block 27. The catch 41 which is adapted to hold the said bar or member 30 against further inward movement until it is released consists of an approximately L-shaped lever fulcrumed at its angle by a screw 43 or other suitable fastening device and having one arm extending longitudinally of the bar or member 30 to which it is secured by the said pivot screw 43. The other arm of the latch lever extends across the upper or inner end of the bar or member 30 and is provided with a slot 44 into which extends a pin 45 projecting from the upper or inner end of a slidable tripping bar or member 46. The upward or inward movement of the arm 36 of the lever 34 compresses the spring 37 and also carries the trip bar 46 upward and swings the latch lever on its pivot 43 against the action of a coiled spring 46ª. The catch proper 41 extends from the lower or outer end of the longitudinal arm of the L-shaped lever and the coiled spring 46ª is interposed between the catch and the slidable bar or member 30. The catch is shouldered at its inner or upper edge and is beveled at its outer side edge, the shoulder projecting laterally to engage the stop pin. When the arm 2 reaches the latch 24 and the latch engages the projecting portion or piece 23 the trip bar operates to withdraw the catch 41 from the stop pin 42 which permits the relatively strong spring 37 of the lever 34 to actuate the slidable bar or member 30 and suddenly withdraw the same with a quick movement from engagement with the lifting block 27. The spring 37 maintains the slidable bar or member at the limit of its inward movement out of the path of the lifting block 27 in the position illustrated in Fig. 7 of the drawings. The trip member 46 is provided in its upper and lower portions with longitudinal slots 47 and 48. The upper or inner slot 47 receives a pin or screw 49 which is carried by the inner end of the cam actuated lever 34 and the lower or outer slot 48 receives a headed pin or screw 50 of the slidable bar or member 30. The cam plate 20 which is secured by screws or other suitable fastening devices to the stop lug 18 is provided with a depending tapering portion having a straight vertical cam edge 51 forming a track for the roller 40 and adapted to permit the roller to slide along it while causing the lever 34 to swing on its pivot and actuate the sliding member or bar 30. The inner arm 36 of the lever 34 is connected to one end of a relatively heavy coiled spring 52 secured at its upper or inner end to the said lever 34 and at its lower or outer end to one of the guides 31 and adapted to return the lever 34 to the position illustrated in Fig. 1 of the drawings when the arm and the brake shoe are released and swing downwardly beyond the cam or stop plate 20. The lower end 53 of the slidable bar or member 30 is beveled and the trip bar 46 which has a beveled lower end 54 normally projects a slight distance below the beveled edge 53 of the bar or member 30 when the brake is applied to permit the beveled end 28ª of the lifting block to engage the trip bar 46 and withdraw the catch 41 from the plane of the stop pin 42 to enable the beveled portion 28 of the said lifting block 27 to engage and lift the bar or member 30 and pass beneath the same in the rotary movement of the wheel 4. By this construction the wheel 4 is permitted to rotate after the brake has been applied and as soon as the lifting block 27 passes beyond the bar or member 30 the parts will be returned to the position shown in Fig. 1 by the springs 52 and 46ª. The parts will be properly spaced by collars or other suitable means on the axle of the car wheel so that the mechanism for resetting the brake shoe will always be in proper position to coöperate with the lifting block.

The arm 2 of the brake shoe is preferably provided with a removable upper section 55 secured to the lower section by upper and lower transverse bolts 56 and 57 which pass through overlapping arms 58 and 59. The body portion of the arm and the removable section 55 are recessed to receive the said arms 58 and 59 which extend above and below the horizontal plane of the axle.

The latch 21 is preferably maintained in its engaging position by a spring 60 secured at its upper end 61 to the upper portion of the latch 21 at the outer edge thereof and adapted to urge the latch toward its engaging position. The lower free end of the spring 60 bears against an electromagnet 62 supported in a substantially horizontal position by a bracket arm 63 and adapted to be energized to attract the latch 21 and swing the same outward to withdraw the latch from engagement with the arm or lever of the brake shoe. The electromagnet is designed to be arranged in circuit with a suitable source of current supply and with operating means which may be positioned at any desired point or points.

What is claimed is:—

1. In a brake of the class described the combination with a wheel and an axle of a brake shoe provided with an arm hung from the axle and adapted to permit the brake shoe to swing beneath the wheel without chocking the latter, the latter being spaced from the brake shoe to permit the wheel to turn freely when the brake is applied.

2. In a brake of the class described, the combination with a wheel of a brake shoe pivotally mounted and arranged to swing beneath the wheel without chocking the latter, said wheel being spaced from the shoe to permit free rotary movement of the wheel when the brake is applied.

3. A brake of the class described including a pivotally mounted brake shoe adapted to swing beneath the wheel without chocking the latter and provided in its upper face with a groove arranged to receive the flange of a car wheel whereby the shoe is prevented from twisting, said wheel being also adapted to turn when the brake is applied.

4. A brake of the class described including a pivotally mounted brake shoe arranged to swing beneath a wheel without chocking the latter and provided in its upper face with a groove to receive the flange of the wheel and having a lower braking face to engage the track, said shoe being also provided at the bottom with a shoulder for retaining it on a rail.

5. A brake of the class described including a pivotally mounted brake shoe adapted to swing beneath a wheel and composed of a body portion and a pivoted beveled nose having a limited movement and yieldably maintained at the limit of its movement in one direction.

6. In a brake of the class described, the combination with a wheel of a pivotally mounted brake shoe, a latch for supporting the brake shoe in an elevated position, and coacting means on the wheel and the brake shoe for automatically carrying the brake shoe upwardly into engagement with the said latch.

7. In a brake of the class described, the combination with a wheel of a pivotally mounted brake shoe and a latch for supporting the same in an elevated position, lifting means carried by the wheel and yieldable means mounted on the shoe and coacting with the said lifting means for swinging the shoe upwardly into engagement with the latch when the wheel is rotated in one direction and for permitting free movement of the wheel independently of the shoe when the wheel rotates in the opposite direction.

8. In a brake of the class described the combination with a wheel of a pivotally mounted brake shoe arranged to swing beneath the wheel, a bar or member movably mounted on the brake shoe, a substantially wedge-shaped lifting block carried by the wheel and arranged to pass beneath the bar or member when the wheel is rotated in one direction and adapted to engage the said bar or member and swing the brake shoe upwardly when the wheel is rotated in the opposite direction and means for supporting the brake shoe in an elevated position.

9. In a brake of the class described the combination with a wheel, of a pivotally mounted brake shoe arranged to swing beneath the wheel, a slidable bar or member mounted on the brake shoe, a lifting block carried by the wheel and arranged to pass beneath the slidable bar or member when the wheel is rotated in one direction and adapted to engage the said bar or member and lift the brake shoe when the wheel is rotated in the opposite direction, means for supporting the brake shoe in an elevated position, and means for withdrawing the slidable bar or member from the path of the lifting block and for holding the said bar or member beyond the block when the brake shoe is at the limit of its upward movement.

10. In a brake of the class described the combination with a wheel, of a pivotally mounted brake shoe arranged to swing beneath the wheel, and provided with guides, a bar or member slidably mounted in the guides and provided with a beveled lower or outer end, means for yieldably urging the bar outwardly, a lifting block carried by the wheel and arranged to pass beneath the bar or member when the wheel is rotated in one direction and adapted to engage the bar or member and swing the brake shoe when the wheel is rotated in the opposite direction, a lever connected with the bar or member and carried by the brake shoe and means arranged in the path of the lever for swinging the same to withdraw the bar or member from engagement with the lifting block when the brake shoe is elevated.

11. In a brake of the class described the combination with a wheel of a pivotally mounted brake shoe arranged to swing beneath the wheel, a slidable bar or member mounted on the brake shoe, means carried by the wheel for engaging the said bar or member to swing the brake shoe upwardly, a lever carried by the brake shoe and connected with the bar or member, and a cam arranged in the path of the lever and adapted to swing the same for withdrawing the bar or member from the coacting means of the wheel.

12. In a brake of the class described the combination with a wheel of a brake shoe arranged to swing beneath the wheel, a slidable bar or member carried by the brake shoe, means mounted on the wheel and cooperating with the bar or member to swing the brake shoe upwardly, a lever mounted on the brake shoe and provided with a spring engaging the said bar or member and permitting the lever a limited movement independently of the slidable bar or member, a catch carried by the slidable bar or member, a stop located in the path of the catch for engaging the same to limit the movement of the said bar or member to effect a compression of the springs and means operated by the said lever for tripping the catch to release the slidable bar or member and cause the same to be actuated by the said springs.

13. In a brake of the class described the combination with a wheel of a brake shoe arranged to swing beneath the wheel, a slidable bar or member carried by the brake shoe, means mounted on the wheel and cooperating with the bar or member to swing the brake shoe upwardly, a lever mounted on the brake shoe and provided with a spring engaging the said bar or member and permitting the lever a limited movement independently of the slidable bar or member, a latch carried by the slidable bar or member, a stop located in the path of the catch for engaging the same to limit the movement of the said bar or member to effect a compression of the springs, and a trip bar slidably connected with the said bar or member and arranged to be actuated by the lever to trip the catch to release the said bar or member to cause the latter to be actuated by the said spring.

14. In a brake of the class described, the combination with a wheel of a brake shoe arranged to swing beneath the same, a slidable bar or member carried by the brake shoe and having a beveled lower or outer end, a lever also carried by the brake shoe and having yieldable means for engaging the slidable bar or member, means located in the path of the lever for actuating the latter, a spring actuated catch carried by the slidable bar or member, a stop located in the path of the catch, a trip bar slidably mounted and connected with the spring actuated catch and with the lever and having its beveled lower or outer end adapted to extend beyond the lower or outer end of the slidable bar or member, and a lifting block carried by the wheel and arranged to coact with the slidable bar or member to swing the brake shoe upwardly when the wheel rotates in one direction and to pass beneath the slidable bar or member when the wheel is rotated in the opposite direction.

In testimony whereof I affix my signature in presence of two witnesses.

GEORGE W. MEGNIN.

Witnesses:
GEORGE E. MEGNIN,
ELIZA M. BORGER.

Copies of this patent may be obtained for five cents each, by addressing the "Commissioner of Patents. Washington, D. C."